F. BERNIER.
PICKER STICK ATTACHMENT FOR LOOMS.
APPLICATION FILED MAY 25, 1914.
1,153,595.
Patented Sept. 14, 1915.
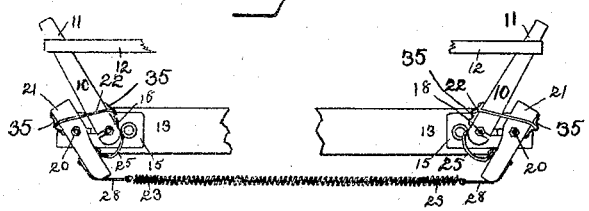
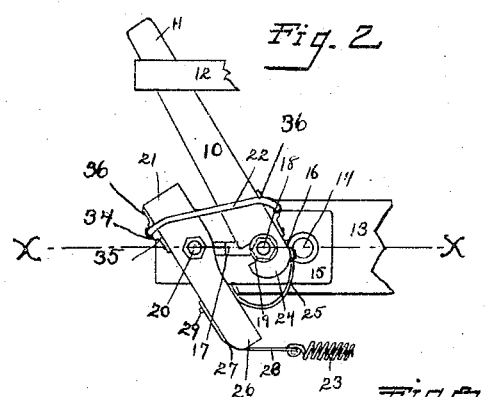
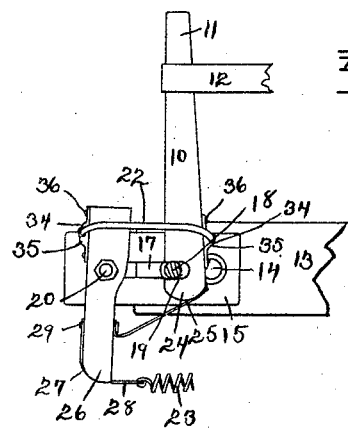
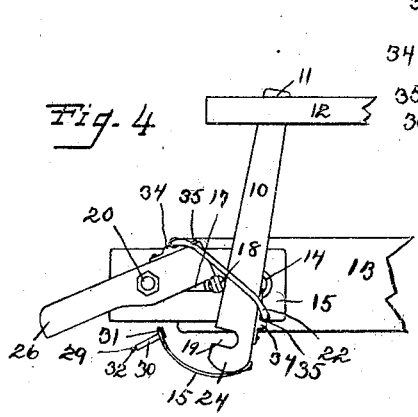
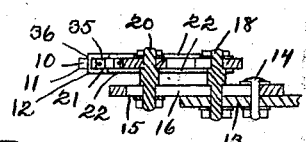
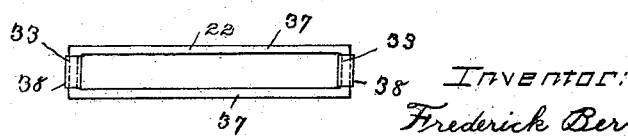
Witnesses:
R. W. Edwards.
H. C. Kingsley.
Inventor:
Frederick Bernier.
By Louis M. Schmidt
Atty.

UNITED STATES PATENT OFFICE.

FREDERICK BERNIER, OF FITCHBURG, MASSACHUSETTS.

PICKER-STICK ATTACHMENT FOR LOOMS.

1,153,595.  Specification of Letters Patent.  Patented Sept. 14, 1915.

Application filed May 25, 1914. Serial No. 840,739.

*To all whom it may concern:*

Be it known that I, FREDERICK BERNIER, a citizen of the United States, residing at Fitchburg, in the county of Worcester and State of Massachusetts, have invented certain new and useful Improvements in Picker-Stick Attachments for Looms, of which the following is a specification.

My invention relates to improvements in picker stick attachments for looms and the object of my improvement is to produce a picker stick and supporting means therefor by means of which the liability to breakage and the damage resulting therefrom by the form of construction at present in use will be very much reduced and will be practically eliminated.

In the accompanying drawings: Figure 1 is a front elevation of a pair of picker sticks embodying my invention and some of the parts connected thereto. Fig. 2 is a similar view on an enlarged scale of one of the picker sticks shown in Fig. 1 and the adjacent parts. Fig. 3 is a similar view of the same with the parts in the positions after the upper end has been interrupted and just previous to the dismounting of the picker stick and release of the spring. Fig. 4 shows the picker stick in dismounted condition and the spring released. Fig. 5 is a sectional view on the line $x$—$x$ of Fig. 2. Fig. 6 is a side elevation of the disconnecting pin. Fig. 7 is a plan view of the connecting loop. Fig. 8 is a fragmentary view of certain parts shown in Fig. 3.

The picker sticks shown in Fig. 1 are arranged in a pair as usual, as a left and a right, and are otherwise similar, and comprise each a picker stick proper 10 and means for supporting the same to be described. The inner side 11 of the upper end of the picker stick 10 serves as a bearing surface for engaging with the shuttle. Just below the bearing surface 11 the picker stick 10 is engaged by some form of propelling means 12 which when in use tends to move the picker stick inwardly, so as to throw the shuttle across the loom. As in common use the lower end of the picker stick is pivotally supported on the frame 13 by a pivotal pin which I replace by the bolt 14. I utilize the bolt 14 for securing to the said frame 13 a plate 15 on which is mounted the supporting means for the picker stick to be described. The frame 13 extends appreciably outwardly from the bolt 14 and is provided with a slot 16. The plate 15 is provided with a slot 17 in registration with the slot 16. The bolt 14 is in one portion of the slots 16 and 17 and coöperative therewith and positioned in another portion of the said slots is a special pin or stud 18, which also serves as the lower support for the picker stick 10. The stud 18 is a double stud, the rear end of which engages with the slots 16 and 17 and the front end of which is rather loosely engaged with the lower end of the picker stick 10 under normal conditions, by being positioned in the outwardly directed slot 19 provided in the said lower end. A third bolt or stud 20 is secured in the slot 17 in the plate 15 by its rear end and the front end thereof serves as a pivotal support for the auxiliary stick 21. The auxiliary stick 21 is relatively short, is normally approximately parallel with the picker stick 10, and the upper end thereof is linked to the picker stick 10 by the loop 22, and the lower end is connected to one end of the spring 23, and in a manner that permits of its being disconnected therefrom in case of emergency. Normally the propelling means 12 serve to move the picker stick 10 inwardly and the loop 22 serves as a link to move the auxiliary stick 21 correspondingly and the return movement is effected by the spring 23 operating on the auxiliary stick 21 and by means of the upper end of the same and the loop 22 on the picker stick 10. During these normal and regular movements it will be noted that the engagement of the picker stick 10 and its pivotal stud 18 is in the manner of a one sided pivot, the lateral bearing being on the inner side only, the outer side being entirely open because of the open slot 19. Such normal usage is not severe and permits of long life to the parts, as it is well understood that in any case it is not the use under ordinary and normal conditions that warrants any special consideration but it is the abnormal conditions, such as obstruction of the desired free movement of the upper end of the picker stick 10, that requires such special consideration. I provide means by which under the abnormal conditions mentioned the lower end of the picker stick 10 is freed entirely from the stud 18 and the spring 23 is also freed from its connection with the auxiliary stick 21, and I do this in the following manner. The lower end of the picker stick 10 extends a short distance below the slot 19 and the lower face 24 thereof may be rounded suitably for a bearing for a connecting strap 25. The lower end of the auxiliary stick 21 extends appreciably below the lower end of the picker stick 10 and the outer and lower face 27 of the said extension 26 is also formed suitably for a bearing surface for a second strap 28. Approximately opposite to the bearing surface 24 on the picker stick the auxiliary stick 21 is pierced by a hole 29 in which is housed a releasing pin 30. The said pin 30 comprises a body portion that is a sliding fit for the hole 29, a head 31 on the inner end, and a smaller head 32 on the outer end formed by reducing a portion of the body portion slightly inwardly from the extreme outer end.

The first strap or picker stick strap 25 has the inner end secured to the picker stick 10, at the inner portion of the bearing surface 24 and the outer end is connected to the releasing pin 30, adjacent the head 31. The latter connection may be effected by making a hole in the strap through which the body portion of the pin 30 may be threaded so that the strap will be engaged with the head 31. The pin 30 furthermore is of such length that when in position in the hole 29 and with the strap 25 mounted thereon as described the small head 32 will extend outwardly beyond the bearing surface 27, suitably to receive and engage with a hole in the outer end of the second strap 28 or spring strap. The said spring strap 28 extends along the bearing surface 27 and the inner end thereof is connected to the spring 23. Under normal conditions there is no strain on the picker stick strap 25, so that the same is essentially slack, and the spring strap 28 is positively connected to the auxiliary stick 21 by means of the small head 32, so that the normal conditions of operation may be effected in the manner described.

Under the abnormal conditions mentioned and in which the upper end of the picker stick 10 is interrupted in its travel, such for instance as shown in Fig. 3, then the operation is as follows:—It is understood that the propelling mechanism 12 continues to pull on the picker stick 10. The obstruction serves as the fulcrum, the propelling mechanism 12 as the power, and then, operating as a lever of the third class, the work is whatever is effected at the lower end of the picker stick 10. It is obvious that in the case of the ordinary structure in common use the tendency will be to break out the outer side of the picker stick, and this is the result that is borne out by practice. It is also obvious that no such result can follow with my picker stick 10, as the same is provided with an open slot at the point mentioned. What actually happens with my mechanism is that the lower end of the picker stick 10 is pulled away from the pin 18, the latter traveling in the slot 19, and tension is applied to the picker stick strap 25, which finally pulls the releasing or disconnecting pin 30 out of the hole 29, and releases the spring 23 from its connection with the auxiliary stick 21.

It is obvious that the operations described result in throwing the particular picker stick 10 out of commission. I find however that I can also throw the mating picker stick 10 out of commission by interconnecting the two spring straps 28 by a single spring 23, as shown, or connecting together the two springs usually used individually on the picker sticks of the ordinary type. Releasing one of the spring straps 28 releases the tension of the spring 23 so that the other end will either free itself or at any rate become inoperative. Throwing the mating picker stick out of commission when trouble is encountered with the one of them, avoids entirely the usual damage that follows when one of the picker sticks catch.

By the construction described, if the spring or the strap, or picker stick breaks, or the picker stick catches, or box motion catches, the picker stick 10 will be thrown out of commission on both sides, and avoids the damage that results from such conditions in the mechanism at present in use. As described, the loop 22 serves to cross-connect the picker stick 10 and the auxiliary stick 21. The said loop 22 engages by its ends 33 with bearings 34 provided one on the outer side of the auxiliary stick 21 and the other on the inner side of the picker stick 10. The said bearings 34 are provided in bearing blocks 35, secured to the sticks 10 and 21 by screws 36, and in such a manner as to permit of adjustment as by means of slots 39 in the blocks 35, and a corresponding change in the power. The auxiliary stick 21 serves to hold the picker stick 10 in place. To hold the picker stick 10 with more power, the bearing on the auxiliary stick 21 is moved downwardly and vice versa. A corresponding change in power, and speed in the operation of the picker stick 10 is obtained by a similar shifting of the bearing on the picker stick.

The loop 22 as shown is a closed, endless and generally rectangular structure, comprising parallel bars 37 at the front and rear, cross-connected at the ends by the cross-bars 33, which serve as bearings in co-operation with the movable bearings 34. The cross-bars 33 may be provided as shown with anti-friction rollers 38.

What I claim as my invention is:—

1. A picker stick having a slot in the lower end, a stud positioned in the said slot, an auxiliary stick pivotally supported adjacent the said picker stick, a loop connecting the upper end of the said auxiliary stick with the said picker stick, the lower end of the said auxiliary stick having a hole, a releasing pin in the said hole, a strap connecting the said pin and the lower end of the said picker stick, a spring, and means for removably connecting the said spring and the said releasing pin.

2. In combination a pair of mating picker sticks having open slots at their lower ends, a single spring, a pair of fixed studs and means interconnecting the ends of the said spring with the said picker sticks, whereby the said studs will be positioned one in each of the said slots suitably to serve as a fulcrum support therefor under normal conditions of operation and which permit of disengaging the said picker sticks from their studs under abnormal conditions of operation.

3. A picker stick having an open slot at the lower end, a fixed stud engaged with the said slot, an auxiliary stick pivotally supported adjacent the said lower end, means inter-connecting the said auxiliary stick and the lower end of the picker stick, a spring operative to normally position the said picker stick, and the said spring being connected to the said auxiliary stick.

4. A picker stick having an open slot at the lower end, a stud positioned in the said slot, an auxiliary stick pivotally mounted and positioned adjacent the said lower end, means interconnecting the upper end of the said auxiliary stick and the said picker stick, and means for connecting the lower end of the said auxiliary stick and the said picker stick and operative to permit the dis-connecting of the same under abnormal conditions of operation.

5. A picker stick having an open slot at the lower end, a stud positioned in the said slot, an auxiliary stick pivotally mounted and positioned adjacent the said lower end, a yoke connecting the upper end of the said auxiliary stick and the said picker stick, and a connection for the lower end of the said auxiliary stick and the said picker stick comprising a strap, connected by one end to the said picker stick, a pin connected to the other end of the said strap, and the said auxiliary stick having a hole for the said pin, and a spring having one end removably connected to a portion of the said pin.

6. A picker stick combination for looms comprising a picker stick, a fixed pivotal support therefor near its lower end, the said lower end of the picker stick having a slot that is open at the outer side for engaging with the said support, an auxiliary stick pivotally mounted, positioned adjacent the said picker stick, and means interconnecting the said picker stick and auxiliary stick operative to so connect them that they will have a limited to and fro movement in unison with the said picker stick engaged with the said support under normal conditions of operation and to permit of dismounting the said picker stick from the said support under abnormal conditions.

7. In combination in a loom, a frame, a stud fixedly supported by the said frame, a picker stick, and the said picker stick having a slot at the lower end that is open at the outer side for receiving the said stud.

FREDERICK BERNIER.

Witnesses:
ARTHUR GIROUARD,
JAMES A. RUTHERFORD.